United States Patent Office 3,295,990
Patented Jan. 3, 1967

3,295,990
INACTIVE DRY YEAST AND PROCESS OF
MAKING SAME
Peter J. Ferrara, 50 E. 78th St., New York, N.Y. 10021,
and Gaston Dalby, 51 5th Ave., New York, N.Y.
10003
No Drawing. Filed June 17, 1963, Ser. No. 288,451
9 Claims. (Cl. 99—96)

Our invention relates to an inactive dry yeast and to a process for making the same.

Inactive dry yeasts, primary grown, such as baker's yeast or the by-product of fermentation, such as that used in the making of malt beverages, either *Torulopsis utilis* (commonly known as torula) or *Saccharomyces cerevisiae* have potentially valuable properties for use in bread. They contain 50% protein of high nutritional value, are also rich in B vitamins and have the capacity to impart excellent flavor to bread. Despite these generally accepted advantages, inactive yeasts are seldom used in bread doughs, or when used, are employed at very low levels. This limiation on the use of these yeasts is the result of the harmful effect of the yeast on the characteristics of the dough, causing a coarsening in bread texture and a reduction in loaf volume.

Yeast is recognized as a good source of glutathione, a peptide unit consisting of one molecule each of glutamic acid, cysteine and glycine. In the reduced state, the sulphur in the cysteine portion is in the form of —SH. The glutathione molecule also exists in the oxidized state, wherein two molecules of glutathione are joined together by a disulphide linkage —S—S—. When yeast cells are broken up, as by heat inactivation and drying, the glutathione which is concentrated in the region just inside the wall of the yeast cell, is liberated.

One of the accepted theories of how wheat flour and water mixed together can be made into an elastic dough is based on the behavior of flour protein having both —SH and —S—S— groups. The proteins of wheat flour are known to be a multiple or chain of simple amino acid groups of which cysteine and cystine are two. These sulphur bearing protein units, when flour is made into a dough, enter into a continuing series of reactions. One —SH unit and another —SH are brought together so as to form a new disulphide bridge, —S—S—. The displaced hydrogen atoms invade an older —S—S— linkage reconverting it to two —SH containing units. This constant movement, joining up of molecules, and breaking apart of others can take place either in a long protein chain so as to create the linkages which might be considered internal bonds, or may take place in a branching pattern from one protein across to a unit in a somewhat parallel position. The important point is that through this type of chemical combination and reforming, there is obtained the elastic framework of protein units which are the basis of the dough characteristics associated with a wheat flour dough.

The active —SH and the —S—S— units in the protein of the flour are mostly in the form of cysteine and cystine free to react chemically although a quantity are also present in the form of glutathione, the peptide referred to as appearing in yeast cells. Bakers using flour made from freshly harvested wheats refer to them as "green" because a large proportion of the —SH is present in this reduced stage, or the cysteine unit. As flour "ages" either by standing or subjected to commercial oxidative procedures well known and commonly practiced in the art, some of the free cysteine is oxidized to cystine and the disulphide linkages previously referred to are developed. Should the oxidation of flour become too complete, or go "too far," the flour becomes "dead" or highly deficient in the preferred dough forming properties. To obtain optimum doughing performance of a flour, a correct proportion of cysteine to cystine must be achieved.

The supplementation of normal flour doughs with yeast containing substantial levels of glutathione will therefore introduce a number of —SH and —S—S— units which are then capable of entering the cycle accounting for the protein network. Just what combinations or recombinations of protein units and the yeast glutathione take place are not precisely identifiable, but it is known that a "good flour" may act as a "poor flour" through the introduction of inactive dry yeasts. In the past, numerous attempts have been made to subject yeasts to strong oxidation before adding these to bread flours or doughs. This was done on the basis that glutathione from the yeast source, in the oxidized form, was free of its highly damaging action. It takes only the simplest laboratory apparatus to prove that glutathione in the oxidized state, as well as in the reduced state, in an inactive or dead yeast is exceedingly harmful to dough properties.

We have found that glutathione from yeast sources, whether in the oxidized or reduced form, is the cause of the undesirable actions on dough characteristics. With this in mind, our invention is to bring about the conversion of the glutathione so as to alter it into a unit which can no longer function as a competitive factor in the chemistry between the protein units of a bread flour. The glutathione in the usual yeasts on a percentage of dry matter basis ranges from 0.03% to 0.10%. The yeast proteins, 50% or more, are virtually unchanged inasmuch as the molecular changes are directed at the glutathione which is present in very small amounts.

It is known that many compounds, having a certain type of double bond, are reactive with sulphydryl or —SH units and thus can be made to form various combinations depending on the active state of the double bond.

As an illustration of this reaction, we refer to the reaction of fumaric acid and a sulphydryl unit identified as RSH, where RSH may be the tripeptide, Glutathione:

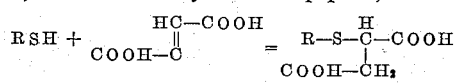

In the end product, as shown, the sulphur is no longer transitorily attached but is combined and firmly held between two adjacent carbon atoms.

We have found that sequestering the reduced form of glutathione by this device does not fully answer the requirements of the baker but that the oxidized form of glutathione must also be isolated from the chemistry of dough formation.

Accordingly, in our processing we first subject the glutathione in yeast to the action of a reducing agent so that all of the glutathione is thereby made into the —SH form and thus capable of being linked up to the preferred double bond, fixing a carbon atom on each side of the sulphur.

The literature suggesting the types of reducing agents useful for reducing the —S—S— linkage to —SH is extensive. Hydrogen with a suitable catalyst, hydroxylamine, low molecular weight acids such as ascorbic and isoascorbic acids, and salts of these acids, solutions of zinc in sulphosalicylic acid, low moleculer weight aldehydes such as pyruvic aldehyde, and many more similar agents are well known in the art.

Once the glutathione has been brought to the reduced state, the choice of a compound acceptable in food products and containing reactive double bonds capable of restraining the sulphur atom is similarly subject to a wide selection. Such double bond materials include fumaric acid, maleic acid, crotonic and isocrotonic acids, citraconic acid, and certain of their salts, such as the potassium and sodium salts, acrolein, etc. which have a double bond or vinyl linkage between two carbon atoms and at least one carboxyl or aldo group associated with said double bond.

When employing the reducing action of ascorbic acid or isoascorbic acid, the reduction of the —S—S— requires the use of 0.03% to 0.75% based on the dry yeast solids. The preferred range, in most cases, is between 0.20% and 0.40%. The required amount may be determined by chemical analysis of the oxidized glutathione, which generally is 4 to 5 times the amount of glutathione in the reduced state. In most cases, the reduction occurs easily at room temperature, though we have found a temperature of 65°–80° C. to be preferred. This not only results in complete reduction, but in the instance of live yeasts, simultaneously effects the inactivation or plasmolysis of the yeasts. 5 to 10 minutes at the higher temperature levels are sufficient intervals for the desired degree of glutathione reduction.

In the matter of the chemicals offering the reactive double bonds, fumaric acid is effective at levels of from 0.10% to 1.25%, depending on the nature of the yeast product. The preferred range, in most cases, is between 0.50% and 0.80% based on the yeast solids.

We have found that the process of reducing the glutathione and causing it to be effectively linked to the carbons adjacent to the reactive bonds can be carried out in sequence or simultaneously, and the final result is the same.

The work hereinbefore described has been applied to active yeasts in the creme stage, as these are produced by centrifuging of primary fermentary worts, and with yeasts previously inactivated and dried. In the latter case, the dried yeasts are re-slurried in water at 15% to 20% solids, and handled just as if the yeasts were in the "creme" stage of manufacture.

Having hereby outlined the method of dealing with the unfavorable action caused by the introduction of glutathione into doughs, by way of addition of inactive yeasts, we refer to the following examples as illustrations of our method.

*Example 1*

A batch of 1,000 gallons of torula yeast creme derived from fermenting waste sulfite liquor from a paper pulping operation was placed in a tank. The total yeast solids were 164 pounds. To this creme there was added 0.34 pound of isoascorbic acid and 1.0 pound of fumaric acid. The mixture was heated with steam to 70° C. while being agitated and, five minutes after reaching this temperature, it was dried in the normal manner.

A comparison of the bake characteristics using the regular torula yeast and the one specially processed as described in the example revealed a complete absence of any glutathione action. The loaf volumes, even under intensive dough mixing, of the torula yeast treated by our above described process, at 5% levels based on the flour in the dough, were as good as the control loaves, while the non-treated torula yeast produced a loaf with coarse texture, and a volume only 70% of the control loaf.

*Example 2*

A 200 gram sample of dry, inactive, primary grown brewer's type yeast was diluted into a water slurry with 850 ml. of tap water. To the reconstituted yeast slurry, there were added while stirring 0.56 gram of ascorbic acid and 1.04 grams of maleic acid, the slurry was heated to 65° C. and held at this temperature for 20 minutes and subsequently dried in a vacuum oven. The recovered yeast solids were finely ground and examined in bread formulae at levels of 4.0% and 8.0% and showed no tendency to affect the loaf volume. The same result is observable if one uses the C. W. Brabender Co. Farinograph, an instrument designed to measure the mixing characteristics of a flour. When using this apparatus, the dry yeast is added to the flour and sufficient water added to make a dough. With the untreated yeast, the flour protein or gluten broke down after about three minutes mixing time. With the treated yeast, the flour gluten remained in good condition for the full mixing time.

Having described our invention, we claim:

1. A process for inactivating the glutathione in inactive yeast which comprises reducing the —S—S— groups of the glutathione to —SH groups and combining the glutathione through said —SH group with a member of the class consisting of low molecular weight unsaturated organic acids, the salts of said low molecular weight unsaturated organic acids having a reactive double bond and a carboxy group in proximity thereto and of low molecular weight unsaturated aldehydes having a reactive double bond and an aldo group in proximity thereto.

2. The process of claim 1 in which said low molecular weight unsaturated acid is fumaric acid.

3. The process of claim 1 in which said member of said class is an aldehyde.

4. The process of claim 1 in which the member of said class is maleic acid.

5. The process of claim 1 in which the —S—S— of the glutathione is reduced to —SH by treatment of said glutathione with a member of the class consisting of hydrogen, hydroxylamine, ascorbic and isoascorbic acids and their salts, solutions of zinc in sulphosalicylic acid and pyruvic aldehyde.

6. The process of claim 5 in which the member of the class is isoascorbic acid.

7. The process of claim 5 in which the member of the class is ascorbic acid.

8. An inactive plasmolyzed dry yeast containing glutathione in which substantially all of the glutathione is linked through a thio ether linkage to an organic radical of a member of the class consisting of low molecular weight unsaturated organic acids, the salts of said low molecular weight unsaturated acids having respectively a reactive double bond and a carboxy group in proximity thereto and of low molecular weight unsaturated aldehydes having a reactive double bond and an aldo group in proximity thereto.

9. The inactive dry yeast of claim 8 in which said organic radical is maleic acid.

References Cited by the Examiner

UNITED STATES PATENTS

| 1,306,569 | 6/1919 | Whitney et al. | 99—96 |
| 1,386,360 | 8/1921 | Penniman | 99—96 |
| 1,420,557 | 6/1922 | Klein | 99—96 |
| 1,701,081 | 2/1929 | Nilsson | 99—96 |
| 1,970,275 | 8/1934 | Buhrig et al. | 99—10 |

FOREIGN PATENTS 519,855  12/1955  Canada.

OTHER REFERENCES

Hill et al., Organic Chemistry, The Blakiston Company, Philadelphia, 1st Edition, January 1943, page 460.

A. LOUIS MONACELL, *Primary Examiner.*

RAYMOND N. JONES, *Examiner.*

D. M. STEPHENS, *Assistant Examiner.*